J. F. TOOMEY.
METHOD OF AND APPARATUS FOR TESTING REPEATER CIRCUITS.
APPLICATION FILED JAN. 31, 1917.

1,364,158.

Patented Jan. 4, 1921.
6 SHEETS—SHEET 5.

Fig. 5

INVENTOR
J. F. Toomey
BY
Thomas D. Lockwood
ATTORNEY

UNITED STATES PATENT OFFICE.

JOHN F. TOOMEY, OF NEW YORK, N. Y., ASSIGNOR TO AMERICAN TELEPHONE AND TELEGRAPH COMPANY, A CORPORATION OF NEW YORK.

METHOD OF AND APPARATUS FOR TESTING REPEATER-CIRCUITS.

1,364,158.  Specification of Letters Patent.  Patented Jan. 4, 1921.

Application filed January 31, 1917. Serial No. 145,671.

*To all whom it may concern:*

Be it known that I, JOHN F. TOOMEY, residing at New York city, in the county of New York and State of New York, have invented certain Improvements in Methods of and Apparatus for Testing Repeater-Circuits, of which the following is a specification.

This invention relates to testing apparatus for electrical circuits, and more particularly to apparatus for testing the transmission efficiency and ringing apparatus of repeater circuits.

One of the objects of the invention is the provision of a testing apparatus so arranged that it will test several different types of repeater circuits under conditions closely approximating those under which the repeater is used in actual practice, said test including a determination of the transmission in either or both directions in the case of a two way repeater, as well as a test of the ringing or signaling apparatus associated with the repeater, to indicate whether such apparatus is functioning properly.

Another object of the invention is the provision of means whereby when a repeater normally associated with a trunk or connecting line is tested, said repeater may be disconnected from the line or trunk and replaced by a substitute connection over which transmission may take place.

A further object of the invention is the provision of a testing apparatus which will apply any one of several sources of ringing current to a tested circuit, the particular source for which the ringing apparatus is designed being automatically selected upon the association of the testing apparatus with the tested circuit.

Another object of the invention is the provision of a ringing equipment for a repeater circuit, consisting of a ringing relay of high impedance in bridge across the transmission circuit, said relay being sensitive to ringing current, and exercising such control over the signaling apparatus, that the latter will not respond to actuation of the ringing relay by disturbing currents such as Morse currents superposed on the telephone circuit.

Another object of the invention is the provision of a testing apparatus provided with a source of signaling current to operate a signaling relay in the tested circuit, said signaling relay controlling apparatus whereby a source of signaling current is relayed from the tested circuit back to the testing circuit to operate a signal controlling relay at the testing circuit, the circuit of the signal controlled by the latter relay being also controlled by the signaling apparatus at the tested circuit, thereby giving a double check upon the operation of such signaling apparatus.

Another object of the invention is to provide a testing apparatus in which the gain in transmission due to the repeater may be neutralized by a variable net-work which may be set so as to produce a loss in transmission equal to the gain due to the repeater, together with a means whereby the repeater and net-work may be simultaneously disconnected from the transmission circuit, so that the transmission efficiency of the circuit with these elements disconnected may be compared with the transmission efficiency when both elements are in circuit.

Another object of the invention is the provision of a testing apparatus having a net-work to simulate during transmission tests a line with which the circuit to be tested is normally used, said net-work being selectively varied upon its association with different circuits to be tested in accordance with the character of ringing current required to operate the ringing apparatus associated with each circuit.

Another object of the invention is the provision of means whereby when a testing apparatus is associated with a repeater to be tested, a special balancing net-work designed to balance the circuit of the testing apparatus is associated with the repeater.

Other and further objects will be apparent from the following description taken in connection with the accompanying drawing in which Figures 1 and 2 when placed side by side represent a circuit diagram of the universal testing circuit.

*Description of testing apparatus.*

Figure 1:
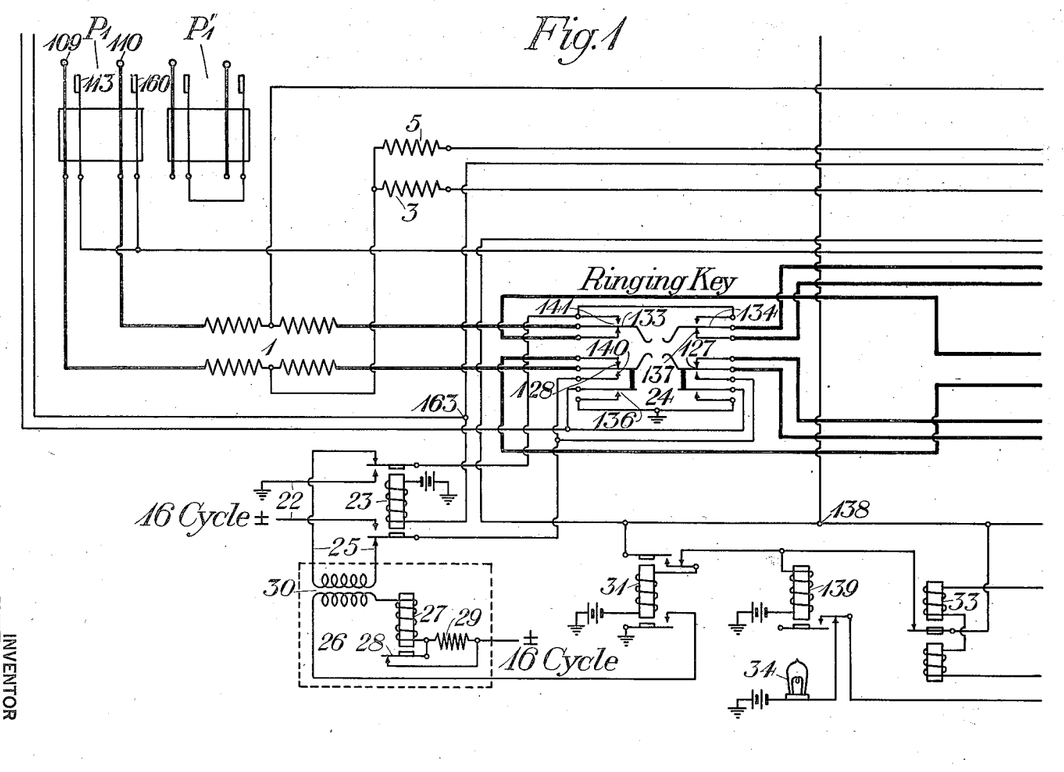
Figure 2:
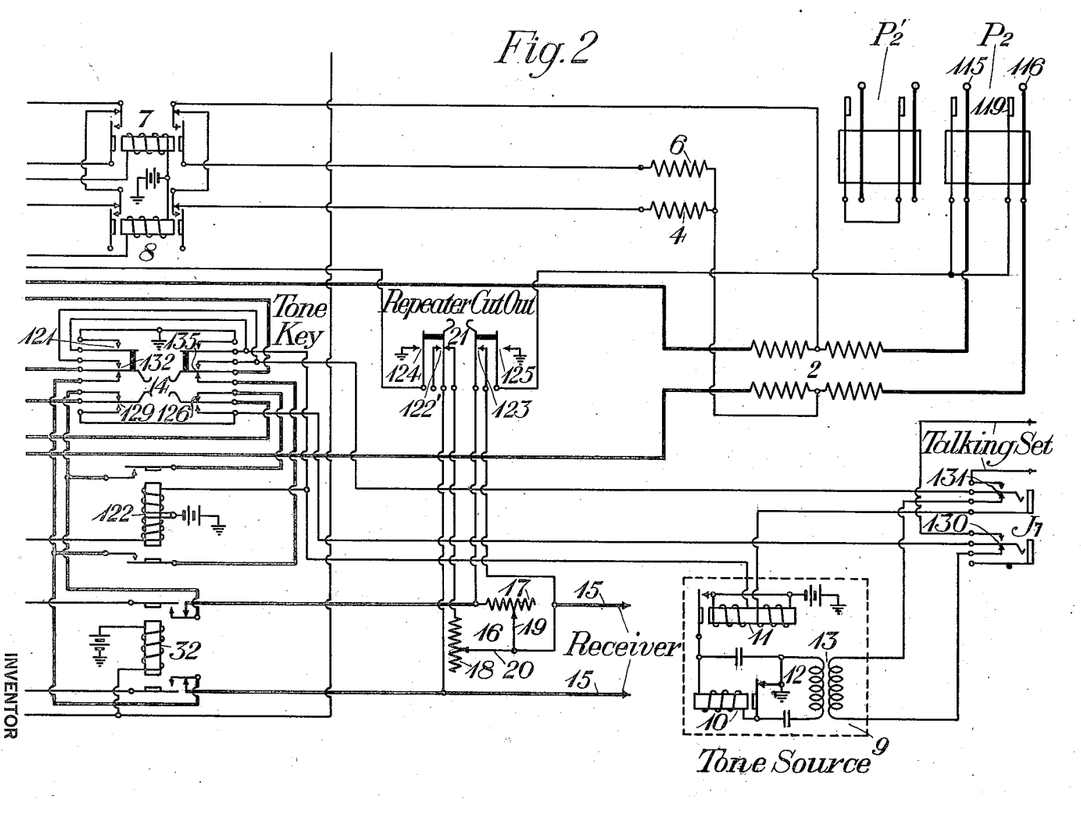

The testing apparatus of Figs. 1 and 2 comprise a pair of twin plugs $P_1$ and $P_2$ 110 adapted to be inserted in jacks associated with the circuit to be tested. These plugs are connected to net-works 1 and 2 adapted to simulate the lines with which the circuit to be tested is associated in its normal use. Each net-work consists of series resistances in each line conductor, bridged normally by shunt resistances 3 and 4. Similar resistances 5 and 6 are also provided which may be substituted for resistances 3 and 4 by contacts under control of relay 7, while by means of contacts under control of relay 8 the shunt paths may be broken.

A tone source 9 is also provided, consisting of a buzzer 10 whose circuit is under control of relay 11, said buzzer causing oscillations in a circuit 12, which work through a transformer 13 into an outgoing circuit. By means of tone key 14 the conductors interconnecting the net-works 1 and 2 may be disconnected and the tone source applied to the conductors leading either through net-work 1 to plug $P_1$ or through net-work 2 to plug $P_2$, at the same time energizing relay 11 to start the buzzer 10 into operation. By the same operation the conductors leading from the opposite plug will be connected through the net-work associated with said plug to a receiving circuit 15. The receiving circuit includes an apparatus 16 known as a receiver shunt comprising a variable series resistance 17 and a variable shunt resistance 18, the amount of resistance being varied by means of two wipers 19 and 20 which are movable in synchronism to cut in more series resistance and less shunt resistance or vice versa. The receiver shunt 16 is designed to vary the transmission efficiency of the receiver circuit 15 and at the same time keep the impedance constant. A repeater cut-out key 21 controls circuit connections whereby the circuit to be tested, which in practice is connected to plugs $P_1$ and $P_2$, may be varied by disconnecting the repeater therefrom and substituting a direct connection therethrough so that the gain in transmission due to the repeater may be observed. The key 21 also serves to cut out the shunt resistance 18 by opening contact 122' and short-circuit the series resistance 17 by closing contact 123 of the receiver shunt 16. By adjusting the receiver shunt until the same effect is produced in the receiver with the repeater and receiver shunt in circuit, as is produced with both cut out, the adjustment of the receiver shunt will indicate the gain in transmission due to the repeater. The receiver shunt 16 may be calibrated in units of transmission gain so as to indicate directly the gain given by the repeater.

Figure 3:
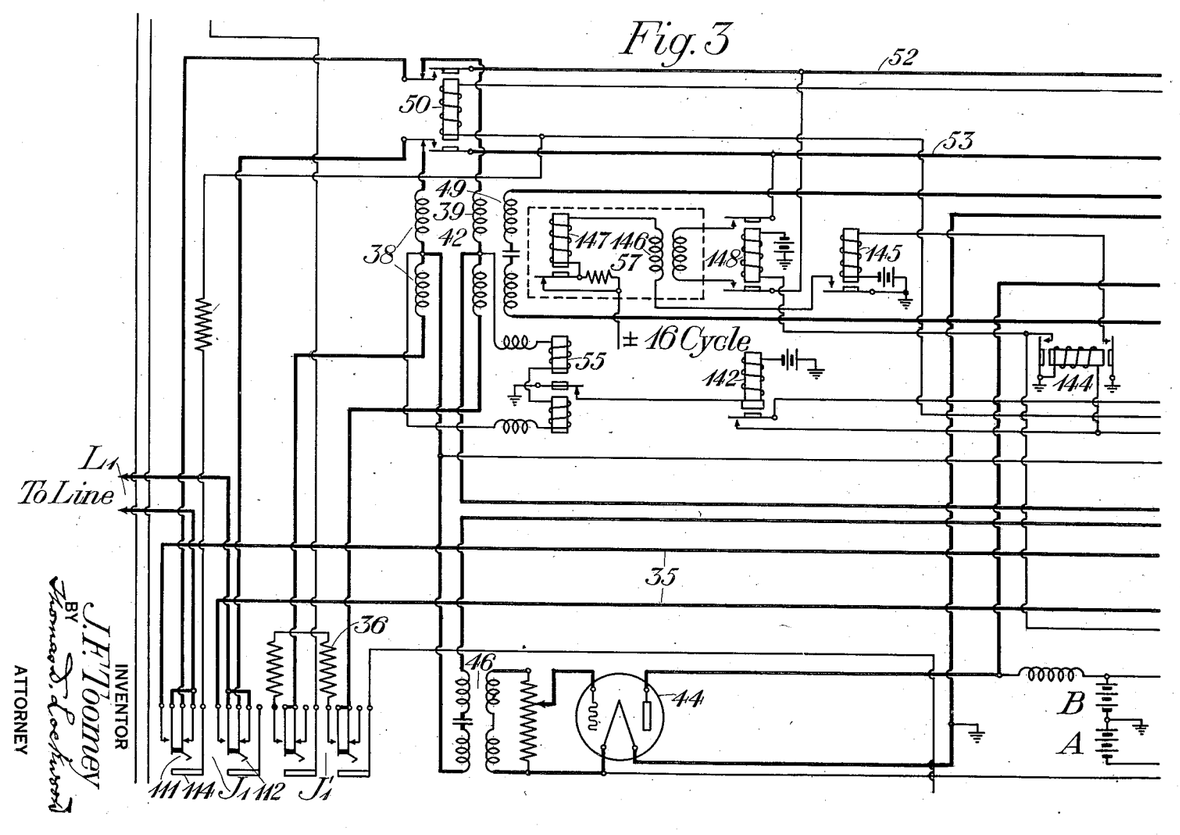
Figs. 3 and 4 similarly positioned represent a diagram of a through line repeater which may be tested by means of the apparatus of Figs. 1 and 2; while Figs. 5 and 6 similarly represent a cord circuit repeater to be tested by the same apparatus.
Figure 4:
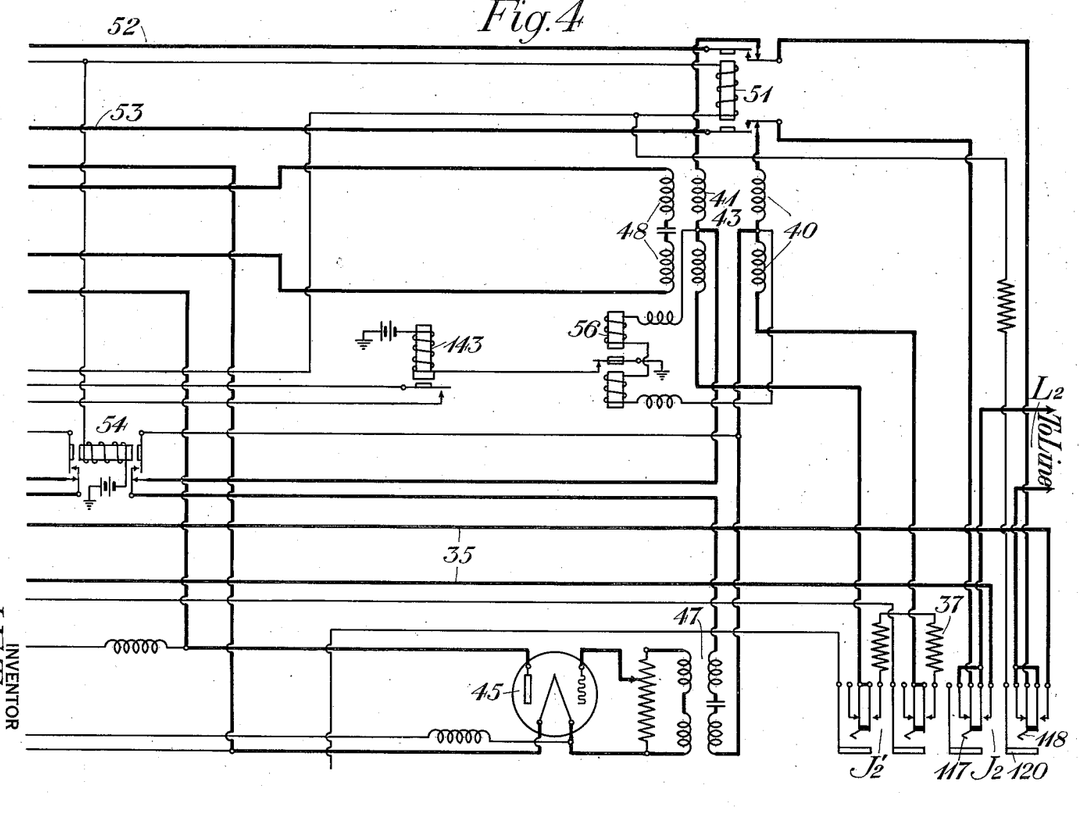
Figure 5:
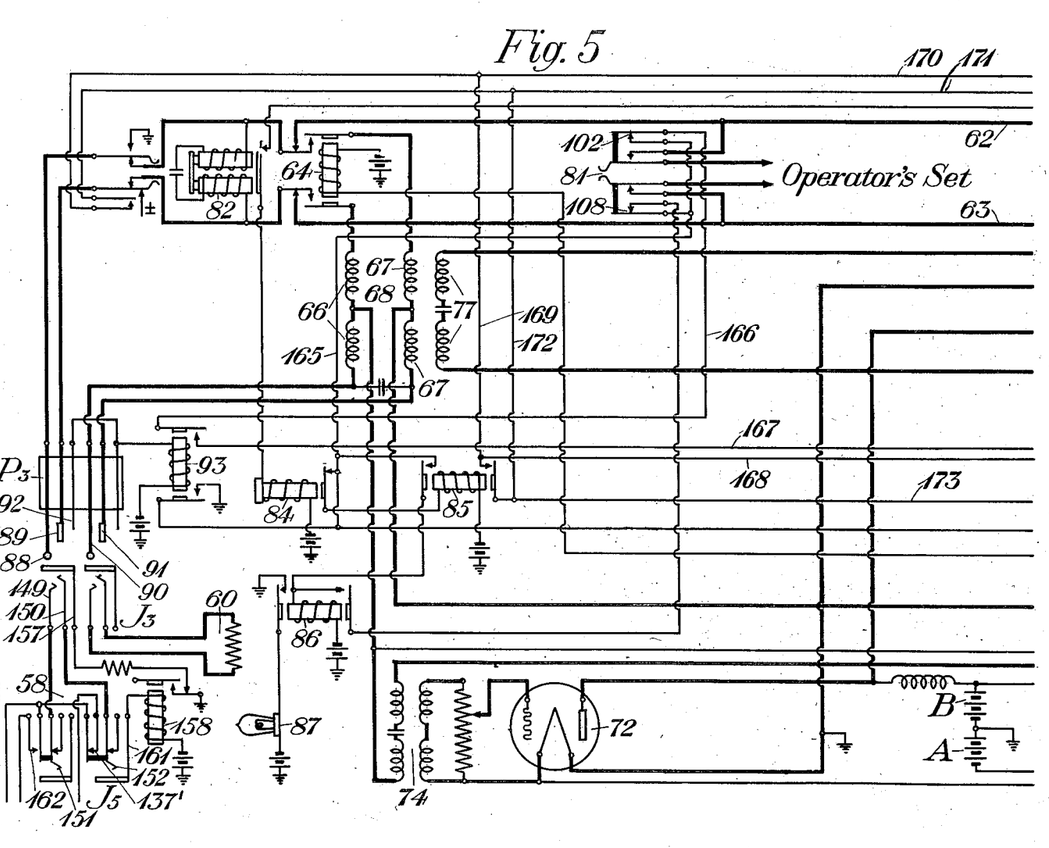
Figure 6:
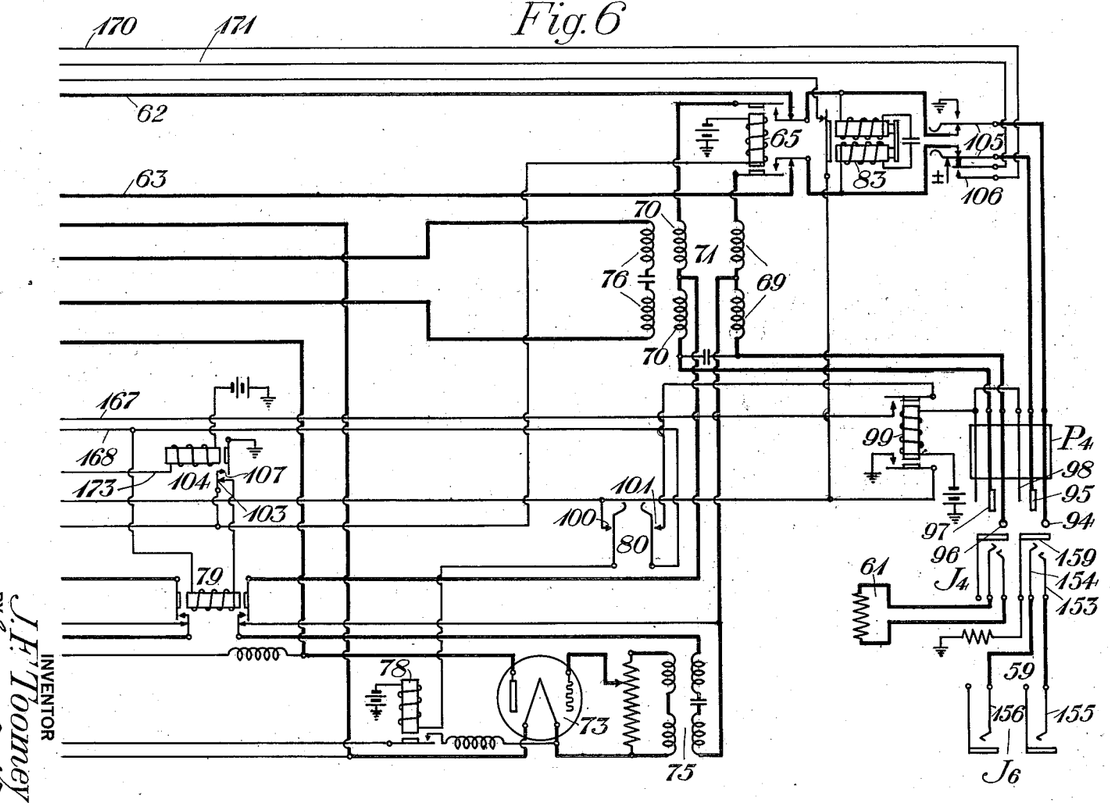

Two sources of ringing current are provided, one to be used when testing the cord circuit repeater and the other for use when the through line repeater is tested. The frequency of the ringing current may be varied as desired depending on the character of the tested circuit. As shown, however, the cord circuit repeater of Figs. 5 and 6 is designed for 16 cycle ringing current while the through line repeater of Figs. 3 and 4 is designed for 133 cycle ringing. Accordingly, a circuit 22 leading to a source of 16 cycle ringing current may be connected by relay 23 to the line conductors leading through plugs $P_1$ or $P_2$ when ringing key 24 is thrown to the left or right, if the plugs $P_1$ and $P_2$ are connected to a cord circuit repeater, since the circuit of relay 23 is under joint control of key 24 and contact 162 of jack $J_5$ of testing trunk 58 associated with the plug $P_1$. If, however, a through line repeater is tested, relay 23 is not energized when the key 24 is thrown, and a circuit 25 leading to a source 26 of 133 cycle current is applied to the line conductors leading through plugs $P_1$ or $P_2$. The said source 26 comprises a buzzer relay 27 whose armature 28 has a period of 133 vibrations per second, and periodically short-circuits a resistance 29 in circuit with a source of 16 cycle current whereby the 16 cycle current is broken up into 133 cycle pulses which work through transformer 30 into circuit 25. When plug $P_1$ is associated with a through line repeater a circuit is controlled by contacts of key 24, contact 137' of jack $J_5$ in testing trunk 58 and the contact of relay 33, whereby upon operating key 24 relay 31 is energized to start the buzzer 27 into operation. At the same time by means of circuits controlled by the ringing apparatus of the through line repeater relay 32 operates to disconnect the receiver circuit 15 from the test circuit and substitute a circuit leading to a relay 33, said relay being responsive to 133 cycle current and controlling an indicating lamp 34.

*Description of through line repeater.*

The through line repeater circuit illustrated in Figs. 3 and 4 terminates in twin jacks $J_1$ and $J_2$ through the contacts of which lines $L_1$ and $L_2$ are connected to the main conductors leading to the input elements of the repeaters, said jacks also operating when plugs $P_1$ and $P_2$ are inserted therein for test purposes, to directly interconnect lines $L_1$ and $L_2$ independently of the repeater through conductors 35. Another pair of jacks $J_1'$ and $J_2'$ operate, when open circuit plugs $P_1'$ and $P_2'$ are inserted therein, to connect artificial lines or testing net-works 36 and 37 to terminals of windings 38, 39, 40 and 41 of two three-winding induction coils 42 and 43, the opposite terminals being connected to lines $L_1$ and $L_2$ through jacks $J_1$ and $J_2$.

Two vacuum tube amplifiers 44 and 45 are also provided, the input circuits being coupled through induction coils 46 and 47 to a bridge connected to the mid-points of the windings 38—39 and 40—41 of induction coils 42 and 43, and the output circuits being connected to the terminals of the third windings 48 and 49 of induction coils 43 and 42.

Relays 50 and 51 are provided which when energized, operate to disconnect the lines $L_1$ and $L_2$ from the repeaters and to interconnect the same through a pair of conductors 52 and 53. A relay 54 may also be operated at the same time to break the connection from the mid-point of windings 39 and 41 to the induction coils 46 and 47, and short-circuit the primary windings of said coils to insure against any possible action of the repeaters when thus disconnected.

Bridged across the mid-point of windings 38 and 39 of transformer 42 is a relay 55 so constructed as to be responsive to 133 cycle ringing current, a similar relay 56 being bridged between mid-points of windings 40 and 41 of transformer 43. Either of these relays function, in response to ringing current from an incoming line to control apparatus whereby 133 cycle ringing current from a source 57 similar to source 26 already described is applied to conductors 52 and 53, said conductors being at the same time connected to the outgoing line by relay 50 or 51 as the case may be. The details of the circuits and apparatus whereby these results are accomplished will be clear from the description of the operation hereinafter appearing.

*Description of cord circuit repeater.*

The cord circuit repeater of Figs. 5 and 6 terminates in a pair of twin plugs $P_3$ and $P_4$ adapted for insertion for test purposes into twin jacks $J_3$ and $J_4$ of testing trunks 58 and 59. One set of terminals of jack $J_3$ leads to another twin jack $J_5$ into which plug $P_1$ of the testing set may be inserted, the other set leading to an artificial line 60. Similarly one set of terminals of jack $J_4$ leads to a twin jack $J_6$ into which plug $P_2$ of the testing set may be inserted, the other set leading to the artificial line 61.

The line terminals of plugs $P_3$ and $P_4$ are normally interconnected by conductors 62 and 63 over the contacts of relays 64 and 65, the former of which, when energized, operates to interconnect the line and artificial line conductors of the plug $P^3$ through windings 66 and 67 of transformer 68. Similarly relay 65 functions to interconnect the line and artificial line conductors of plug $P_4$ through windings 69 and 70 of transformer 71.

The repeater comprises vacuum tube amplifiers 72 and 73, the input circuits of which are connected through transformers 74 and 75 to bridge conductors leading to the middle points of windings 66 and 67 of transformer 68 and windings 69 and 70 of transformer 71 respectively. The output circuit of amplifier 72 is connected to the third winding 76 of transformer 71, the output circuit of amplifier 73 being likewise connected to the third winding 77 of transformer 68. The amplifiers are normally inoperative as the filament heating circuit including battery A and the filaments of the two tubes in series is normally open at the contact of relay 78. Moreover the circuits leading to the primaries of transformers 74 and 75 are held open, and the transformer primaries short-circuited by the contacts of relay 79. Upon throwing key 80, however, (listening key 81 being unoperated and relays 93 and 99 being energized), relays 64, 65, 78 and 79 are energized, relay 78 closing the filament circuit, and relay 79 closing the transformer circuits, while relays 64 and 65 disconnect the line terminals of the plugs $P_3$ and $P_4$ from conductors 62 and 63 and connect them to the repeater circuits. By throwing the listening key 81 the operator can at any time cut out the repeater as the control circuits of relays 64, 65 and 79 pass through a contact of this key.

Relays 82 and 83 are bridged across the line terminals of plugs $P_3$ and $P_4$, said relays being so constructed as to be responsive to 16 cycle ringing current. As these relays are bridged across the talking circuit it is necessary that they present a high impedance to voice currents, as otherwise excessive transmission losses would result. As the high impedance of the relays tends to prevent the passage of ringing current they are so designed as to be very sensitive to the frequency of ringing current used. This results in the relays responding to Morse impulses impressed upon the line conductors, when, as is usually the case, the line is composited for telegraph purposes. In order to prevent the actuation of the ringing apparatus by Morse impulses, said apparatus is not directly under the control of relays 82 and 83, but said relays are arranged to control the normally closed circuits of a slow releasing relay 84, which is so constructed that its armature does not retract during the intermittent opening of its circuit by the passage of Morse impulses through relays 82 and 83, but retracts when the armature of relay 82 or 83 is steadily attracted under the influence of ringing current. Upon the deënergization of relay 84, relays 85 and 86 are energized and the latter closes the circuit of signal lamp 87.

*Operation of cord circuit repeater.*

Before proceeding to the detailed description of the operation of the various circuits during testing, it is desirable that the operation of the cord circuit repeater during the process of setting up a talking circuit therethrough be understood. Assuming that a call has come into the central office at which the cord circuit repeater of Figs. 5 and 6 is located, the operator in response to the signal inserts the twin plugs $P_3$ into the twin answering jack (not shown) of the calling line or trunk, thereby connecting the line to tip contact 88 and ring contact 89, and connecting the artificial line associated with the calling line or trunk to tip 90 and ring contact 91, at the same time connecting the grounded sleeve contact of the jack to sleeve contact 92 of plug $P_3$, thereby closing a circuit through relay 93. Relay 93 at its lower front contact closes a circuit from ground, contact of relay 93, through back contact of relay 83, back contact of relay 82, winding of relay 84, to battery, thereby energizing relay 84 which opens the circuit of relay 85. The operator also throws listening key 81, thereby bridging the operator's set across talking conductors 62 and 63, and after ascertaining the connection desired, restores the listening key, and inserts the twin calling plug $P_4$ into the corresponding jack of the circuit over which the connection is to be extended, thereby connecting the called line conductors to tip 94 and ring 95 of plug $P_4$ and connecting the artificial balancing network associated therewith to tip 96 and ring 97, at the same time applying the grounded sleeve contact of the jack to sleeve contact 98 of the plug, thereby energizing relay 99. The operator may now operate the key 80, thereby energizing relay 78 over a circuit from ground, lower front contact of relay 99, contact 100 of key 80, winding of relay 78 to battery. Relay 78 at its front contact closes the heating current of the filaments of vacuum tubes 72 and 73 from grounded battery A, contact of relay 78, filaments of tubes 73 and 72 in series to ground. Key 80 at contact 101 closes a circuit for relays 64, 65 and 79, from ground, lower contact of relay 93, contact 102 of listening key 81, upper contact of relay 93, upper contact of relay 99, contact 101 of key 80, winding of relay 79, contact 103 of relay 104, and then in parallel through the windings of relays 64 and 65 to battery. Relay 79, opens the short-circuit across the terminals of the primary windings of induction coils 74 and 75, and includes said windings in the bridge between the mid-points of windings 66—67 and 69—70. Relays 64 and 65 disconnect the line conductors leading from contacts 88 and 89 of plug $P_3$ and 94 and 95 of plug $P_4$ from line conductors 62 and 63, and connect them to the repeater circuits.

The operator also throws the ringing key 105, applying ringing current to the conductors of the called line. If the key 80 has already been operated, ringing key 105 at its contact 106 closes a circuit for relay 104 from ground, lower contact of relay 93, conductor 165, contact 102 of the listening key, conductor 166, upper contact of relay 93, conductor 167, upper contact of relay 99, contact 101 of key 80, conductors 168, 169 and 170, contact 106 of key 105, conductors 171, 172 and 173, and winding of relay 104 to battery. Relay 104 by attracting its armature closes contact 107 and opens contact 103. The closing of contact 107 provides a holding circuit for relays 64 and 65, while the opening of contact 103 breaks the circuit of relay 79, which is deënergized, thereby opening the circuit of the primaries of induction coils 74 and 75 and short-circuiting said windings to prevent any operation of the repeater during ringing. Upon restoring the ringing key, relay 104 is deënergized, thereby completing the circuits of relays 64, 65 and 79 as before so that the lines are interconnected through the repeater and conversation may proceed.

Should it be desired to call the operator at the repeater station during the establishment of this connection, ringing current is sent over the line, operating relay 82 or 83 as the case may be, whereby the circuit through relay 84 is held open long enough to permit its armature to be retracted. A circuit is then closed through relay 85 from ground, lower contact of relay 93, back contact of relay 84, winding of relay 85 to battery. Relay 85 at its right hand contact closes a circuit for relay 104 from ground, lower contact of relay 93, contact 102 of the listening key, upper contacts of relays 93 and 99, contact 101 of key 80, contact of relay 85 and winding of 104 to battery. Relay 104 releases relay 79 to short-circuit the primaries of induction coils 74 and 75, and establishes a holding circuit for relays 64 and 65 as before, so that ringing current does not pass through the amplifiers 72 and 73.

Relay 85 at its left hand contact establishes a circuit for relay 86 from ground, lower contact of relay 93, left hand contact of relay 85, winding of relay 86 to battery. Relay 86 upon energizing establishes a locking circuit for itself over its right hand contact, contact 108 of the listening key, lower contact of relay 93 to ground. At its left hand contact relay 86 closes the circuit of lamp 87 which calls the operator's attention. The operator then throws the listening key 81, thereby opening at contact 108 the locking circuit of relay 86 so that lamp 87 is extinguished, and opening at contact 102 the circuits of relays 64, 65 and 79, (relay 104 having deënergized upon the cessation of ringing current through the ringing relay 82 or 83, thereby restoring the original energizing circuits of relays 64, 65 and 79).

The repeater is now disconnected and the lines connected to conductors 62 and 63 whereby the operator can converse with the party who signaled. Upon restoring the listening key, relays 64, 65 and 79 are again energized and the repeater connected to the lines as before.

With this operation of the cord circuit repeater in mind, the detailed operation of the various circuits during testing will now be described. For convenience, Figs. 1 and 2, 3 and 4, and 5 and 6 should be arranged in pairs side by side, and the three pairs of sheets should then be arranged one above the others, with Figs. 5 and 6 at the top and Figs. 1 and 2 at the bottom.

*Testing amplification of through line repeater.*

Assuming that it is desired to test the gain in transmission due to the amplifiers in the through line repeater circuit of Figs. 3 and 4, plugs $P_1$ and $P_2$ are inserted in jacks $J_1$ and $J_2$ and open circuit plugs $P_1'$ and $P_2'$ are inserted in jacks $J_1'$ and $J_2'$ of the through line repeater. Lines $L_1$ and $L_2$ are thereby disconnected from the repeater circuit and are directly connected through the conductors 35, while tip contacts 109 and 110 of plug $P_1$ are connected to tip springs 111 and 112 of jack $J_1$, sleeve contact 113 of plug $P_1$ being connected to sleeve contact 114 of jack $J_1$. Similarly tip contacts 115 and 116 and sleeve contact 119 of plug $P_2$ are connected to tip springs 117 and 118, and sleeve contact 120 of jack $J_2$. The insertion of open circuit plugs $P_1'$ and $P_2'$ connects testing net-works 36 and 37 to the repeater circuit.

The operator may now throw the tone key 14 to the left and operate the repeater cut-out key 21. The operation of key 14 closes a circuit over its contact 121 through the upper winding of relay 122 and the winding of relay 11 of the tone source, energizing both relays. The relay 11 starts the buzzer 10 into operation and causes a tone to be impressed through transformer 13 upon the outgoing circuit of the tone source. Relay 122 connects the receiver circuit 15 through its contacts to the right hand side of the testing circuit. The operation of key 21 at contact 122′ disconnects the shunt resistance 18 from across the receiver circuit and at contact 123 short-circuits the series resistance 17 of the receiver shunt. At contacts 124 and 125 circuits are closed for repeater cut-out relays 50 and 51 and relay 54 of the through line repeater circuit, as follows: from grounded battery through the winding of relay 54, and then in parallel through winding of relay 50, sleeve contacts 114 and 113 of jack $J_1$ and plug $P_1$, over contact 124 to ground, and through the winding of relay 51, sleeve contacts 120 and 119 of jack $J_2$ and plug $P_2$, and then over contact 125 to ground. Relays 50 and 51 disconnect tip springs 111 and 112 of jack $J_1$ and springs 117 and 118 of jack $J_2$ from the repeater circuit and directly connect them through conductors 52 and 53. Relay 54 opens the circuits from the midpoints of windings 39 and 41 to the primaries of induction coils 46 and 47 and short-circuits said primaries through its alternate contacts. A tone is now applied over the through line connection independent of the repeater to the receiver at the test station, over a circuit as follows:

From the upper terminal of the receiver over contact 123, contact of relay 32, upper contact of relay 122, contact 126 of tone key 14, contact 127 of ringing key 24, lower right hand conductor of the talking circuit of the testing apparatus, net-work 2, tip contact 116, tip spring 118, upper alternate contact of relay 51, conductor 52, upper alternate contact of relay 50, tip spring 111, tip contact 109, lower left hand talking conductor of the testing apparatus, net-work 1, contact 128 of key 24, contact 129 of key 14, contact 130 of twin jack $J_7$, secondary winding of induction coil 13, contact 131 of twin jack $J_7$, contact 132 of key 14, contact 133 of key 24, upper left hand talking conductor of the testing apparatus, net-work 1, tip contact 110, tip spring 112, lower alternate contact of relay 50, conductor 53, lower alternate contact of relay 51, tip spring 117, tip contact 115, upper right hand talking conductor of the testing apparatus, net-work 2, contact 137 of key 24, contact 135 of key 14, lower contact of relay 122, contact of relay 32 to the lower terminal of the receiver.

The operator having noted the volume of sound in the receiver due to currents in the above circuit, repeater cut-out key 21 may now be restored, whereupon relays 50, 51 and 54 are deënergized and the repeater again connected into the talking circuit. The restoration of key 21 also connects in the receiver shunt 16. The tone applied to the line now passes over the normal contacts of relay 50 through the bridge of coil 42 including the primary of induction coil 46 and the left hand normal contact of relay 54. Amplifier 44 now amplifies the tone and impresses it upon winding 48, through which it is transmitted into secondaries 40 and 41, one half of the energy passing to the artificial line 37 and the other half passing over the normal contacts of relay 51 to the receiver of the testing circuit. The bridge including the primary of induction coil 47 being connected to points of equal potential in the secondary windings 40 and 41 is not affected by the amplified current. An amplified tone is now heard in the receiver, and by adjusting the wipers 19 and 20 of the receiver shunt until the same tone is produced in the receiver with key 21 operated as when normal, the gain in transmission through amplifier 44 may be determined from the setting of the receiver shunt. In a similar manner, by throwing tone key 14 to the right the tone may be applied through amplifier 45 and the gain due to this amplifier determined. If desired an idle twin plug may be inserted in jack J₇, thereby disconnecting the tone source, and substituting instead a talking set by which the test may be made.

*Testing ringing apparatus of through line repeater.*

If it be desired to test the ringing apparatus of the through line repeater, ringing key 24 may be thrown to the left, whereupon an energizing circuit for relays 8, 31, 122 and 139 will be closed from ground over contact 136 of the ringing key, contact 137 of jack J₅ of the testing trunk 58 for the cord circuit repeater, through the sleeve contacts of the jack J₁' and the open circuit plug P₁' to terminal 138 from which point the circuit continues in parallel through the lower winding of relay 122 to battery, through the winding of relay 8 to battery and over the contact of relay 33 in parallel through the winding of relay 139 to battery, and through the normal contact and winding of relay 31 to battery. Relay 31 locks itself over the circuit previously traced to terminal 138 and thence over its upper front contact and through its winding to battery. At its lower contact it closes a circuit from ground, through the primary of induction coil 30, and winding of buzzer 27 to a source of 16 cycle ringing current. The buzzer vibrates its armature and periodically short-circuits resistance 29 at a frequency such that 133 cycle alternations are impressed upon circuit 25, and over the normal contacts of relay 23, through alternate contacts 140 and 141 of key 24, through artificial line 1, the plug and jack contacts of the line conductors, and over the normal contact of relay 50 to the bridge including ringing relay 55.

At the same time that relay 31 initiated the operations just described, relay 139 opened the circuit of lamp 34 at its lower contact, and relay 122 connected the right hand talking conductors of the testing apparatus to the normal contacts of relay 32, while the relay 8 in pulling up its armature, disconnected the bridges including resistances 3 and 4 from net-works 1 and 2 the transmission efficiency of the circuits through the net-works being thereby increased. The purpose of this change is to produce a transmission circuit for 133 cycle ringing of greater impedance than the circuit over which ringing normally takes place so that if the high impedance bridge through ringing relay 55 or 56, as the case may be, receives a proper amount of current to actuate said relay, this relay will operate properly when normal ringing takes place.

As soon as 133 cycle ringing current is impressed upon relay 55 from the source 26, said relay pulls up its armature and thereby opens the circuit of relay 142 which releases its armature and closes a circuit from ground through the winding of relay 144, lower contact of relay 142, winding of relay 51, and winding of relay 54 to battery. Relays 144, 51 and 54 are energized, the latter opening the circuits from the mid-points of windings 39 and 41 to the primaries of induction coils 46 and 47 and short-circuiting said primaries to prevent the ringing current from being amplified while relay 51 disconnects the line conductors leading to sleeve springs 117 and 118 of jack J₂ from the repeater and connects conductors 52 and 53 thereto. Relay 144 at its right hand contact closes the circuit of relay 145, which in turn closes a circuit from ground, contact of relay 145, primary of transformer 146, winding of buzzer 147 to a source of 16 cycle ringing current, whereupon the buzzer is excited and applies 133 cycle ringing current through transformer 146. Relay 144 over its left hand contact closes a circuit for relay 148 which connects the source of 133 cycle current 57 to the conductors 52 and 53.

When relay 144 was energized it also closed a circuit over its left hand contact, sleeve contacts of jack J₂' and plug P₂', winding of relay 32 to battery, energizing said relay which connects the ringing relay 33 to the conductors leading to the talking conductors of Fig. 2 of the testing circuit. Ringing current from source 57 now flows over the contacts of relay 148 to conductors 52 and 53, and thence over the front contacts of relay 51, sleeve contacts of jack J₂ and plug P₂, net-work 2, contacts 127 and 137 of ringing key 24, contacts 126 and 135 of tone key 14, front contacts of relay 122, and front contacts of relay 32 to ringing relay 33, which responds and opens at its armature contact, the circuit previously traced for relay 139. Relay 139 upon deënergizing closes a circuit for lamp 34 from grounded battery, lamp 34, sleeve contacts of jack J₂' and plug P₂', over front left hand contact of relay 144 to ground. Lamp 34 therefore glows indicating that the ringing apparatus of the repeater has functioned properly. It should be noted that the circuit for lamp 34 and relay 32 is traced through the left hand contact of relay 144 of the through line repeater. As the latter relay cannot operate unless the ringing relay 55 or 56, as the case may be, has responded, a positive assurance is given that the ringing apparatus of the repeater is functioning properly, and there is no possibility of a false signal of the lamp 34, as might result if its circuit were local to the testing apparatus, and the ringing current from source 26 applied to the repeater were amplified and repeated through jack $J_2$ and plug $P_2$ to the relay 33.

By throwing ringing key 24 to the right, the ringing current from source 26 may be applied to the right hand side of the testing circuit to operate relay 56 of the repeater, which in a manner similar to that of relay 55 controls the application of ringing current from source 57 to the conductors 52 and 53 and the left hand side of the testing circuit and thence to relay 33, thereby causing lamp 34 to glow to indicate that the ringing circuits and apparatus associated therewith are functioning properly for ringing through the repeater in the opposite direction.

tion of cord circuit repeater". The repeater is now connected to the terminals of plugs $P_3$ and $P_4$ over the contacts of relays 64 and 65.

Tone key 14 and repeater cut-out key 21 may now be operated. Assuming key 14 to be thrown to the left, a circuit previously traced is closed over contact 121 thereof through upper winding of relay 122 and winding of relay 11, energizing said relays, the former operating to connect the receiver circuit to the right hand talking conductors of the testing apparatus, and the latter relay functioning to start the tone source 9 into operation. Upon the operation of repeater cut-out key 21, the resistance 18 of the receiver shunt 16 is disconnected and resistance 17 short-circuited, and a circuit is closed from ground over contact 124 of key impressed upon windings 69 and 70 divide equally between the artificial line 61 and the line conductors extending over the front contacts of relay 65, the bridge through the primary of induction coil 75 being connected to neutral points with respect to said amplified waves, so that induction coil 75 is unaffected by such waves. The amplified waves applied to the line over the front contacts of relay 65 flow over plug contacts 94 and 95, and jack contacts 153 and 154 over the talking circuit previously traced through the testing apparatus to the receiver circuit 15. The amplified tone now heard in the receiver may be reduced by varying the setting of the receiver shunt 16 until the same tone is heard in the receiver as was heard with the repeater disconnected. The amplification of the repeater for transmission in this direction may now be determined for the setting of the receiver. In a similar manner by throwing key 14 to the right the amplification in the opposite direction through amplifier 73 may be tested.

*Testing ringing apparatus of cord circuit repeater.*

If it is desired to test the ringing apparatus of the cord circuit repeater, key 24 may be thrown to the left whereupon a circuit is closed from ground over contact 136 of key 24, contact 162 of jack $J_5$ closed when plug $P_1$ was inserted, to terminal 163, from whence the circuit continues in parallel through the winding of relay 23 to battery and winding of relay 7 to battery. Relay 7 operates to disconnect the bridges including resistances 3 and 4 from net-works 1 and 2, and substitute bridges of higher impedance through resistances 5 and 6. The object of this change is to produce a transmission circuit for 16 cycle ringing current of greater impedance than the circuit over which ringing normally takes place so that if the high impedance bridge through ringing relays 82 or 83, as the case may be, receives a proper amount of current to actuate said relay, this relay will operate properly when normal ringing takes place.

The energization of relay 23 causes 16 cycle ringing current to be applied over conductors 22, front contacts of relay 23, contacts 140 and 141 of key 24, net-work 1, tip contacts 109 and 110, tip springs 151 and 152, springs 149 and 150 of jack $J_3$, contacts 88 and 89 of plug $P_3$ to the winding of ringing relay 82, which pulls up its armature during the application of the ringing current, thereby opening the circuit of relay 84 which deënergizes and at its back contact closes a circuit through relay 85. Relay 85 now causes the same circuit changes as already described under the heading "Operation of cord circuit repeater," whereby the lamp 87 is caused to glow, thereby indicating that the ringing apparatus at the left hand end of the cord circuit is functioning properly.

By throwing ringing key 24 to the right, 16 cycle current will be applied over the right hand talking circuits to ringing relay 83, which opens the circuit of relay 84 and causes lamp 87 to glow, thereby indicating that the ringing apparatus is in proper working condition for ringing from the opposite end of the cord circuit.

It will thus be seen that a comparatively simple and effective testing apparatus has been devised, whereby the several different types of repeater circuits may be tested, both as to transmission for talking purposes, and as to ringing, and while the apparatus as illustrated and described is particularly designed for use with certain types of circuits, and for use with ringing currents of a definite character, it will be understood that the same may be varied for use with ringing current of any character, and may be varied for use with a great variety of circuits. In short various changes and modifications of the arrangement may be made within the scope of the appended claims, without departing from the spirit of the invention.

What is claimed is:

1. A test circuit, a source of current variations therefor, means to amplify current variations impressed on said circuit, means independent of said amplifying means to vary the transmission efficiency of said circuit, and means to simultaneously disconnect said amplifying means and said transmission varying means from said circuit.

2. A test circuit, a source of current variations therefor, a repeater associated with said circuit for amplifying current variations impressed thereon, means independent of said repeater to vary the transmission efficiency of said circuit, and means to simultaneously disconnect said repeater and said transmission varying means from said circuit.

3. A test circuit, a source of current variations therefor, means to amplify current variations impressed on said circuit, means to vary the transmission efficiency of said circuit comprising a net-work having variable characteristics, and means to simultaneously disconnect said amplifying means and said transmission varying means from said circuit.

4. A test circuit, a source of current variations therefor, indicating means for said circuit, means to amplify current variations impressed upon said circuit, means independent of said amplifying means to vary the transmission efficiency of said circuit, means whereby said amplifying means and said transmission varying means may be simultaneously connected in or disconnected from said circuit, whereby the effect of the current variations on said indicator may be observed both when said amplifying means and said transmission varying means are connected in and disconnected from said circuit.

5. A testing system comprising a circuit to be tested, an amplifying means associated with said circuit, means associated with said circuit for connecting and disconnecting said amplifying means, a testing apparatus and means associated with said testing apparatus for governing said connecting and disconnecting means.

6. A testing system comprising a circuit to be tested, said circuit including line terminals, an amplifying means, an auxiliary current path, means operative to interconnect the line terminals either through said amplifying means or said auxiliary path, a testing apparatus and means associated therewith and operative when said apparatus is connected to said circuit to control said interconnecting means.

7. A testing system comprising a transmission circuit, said circuit including an apparatus to be tested and line conductors, said line conductors being interconnected through said apparatus to be tested, an auxiliary path, a testing apparatus, and means, operating upon the connection of said testing apparatus to said apparatus to be tested, to disconnect the latter from said line conductors and interconnect the line conductors through said auxiliary path.

8. A testing system comprising a plurality of circuits to be tested, each of said circuits including line conductors, an amplifying means and an auxiliary path, said line conductors of certain of said circuits being normally interconnected through said amplifying means, and said line conductors of other of said circuits being normally interconnected through said auxiliary path, a testing apparatus, means for connecting said testing apparatus with any one of said circuits, said connecting means operative upon the connection of said testing apparatus to a circuit normally interconnected through an auxiliary path to interconnect the same through said amplifying means, and means associated with said testing apparatus, operative when said testing apparatus is associated with a circuit to be tested of either type, to disconnect the amplifier, and interconnect the circuit through the auxiliary path.

9. A testing system comprising a plurality of circuits to be tested, certain of said circuits having associated therewith apparatus responsive to current of one characteristic, other of said circuits having apparatus associated therewith responsive to current of another characteristic, a testing apparatus having current sources of different characteristics, and means operative upon the connection of the testing apparatus to one of said circuits to select a current source of such characteristic as will cause the apparatus of that circuit to respond.

10. A testing system comprising a plurality of circuits to be tested, apparatus individual to said circuits, the apparatus for different circuits being responsive to current of different characteristics, testing apparatus having current sources of different characteristics, and means operative upon the association of the testing apparatus with one of said circuits to select the current source to which the apparatus of that circuit is responsive.

11. A testing system comprising a plurality of circuits to be tested, signaling apparatus for each of said circuits, the signaling apparatus of different circuits being responsive to currents of different characteristics, testing apparatus having current sources of different characteristics, and means operative upon the association of said testing apparatus with one of said circuits to select the current source to which the signaling apparatus of that circuit is responsive.

12. A testing system comprising a plurality of circuits to be tested, ringing apparatus for each of said circuits, the ringing apparatus of different circuits being responsive to currents of different frequencies, testing apparatus having current sources of different frequencies associated therewith, and means operative upon the association of said testing apparatus with one of said circuits to select a current source of the frequency to which the ringing apparatus of that circuit is responsive.

13. A testing system comprising a circuit, said circuit including line terminals interconnected through an apparatus to be tested, means associated with said apparatus responsive to current coming in over one terminal to control the application of current to another terminal, a testing apparatus including a source of current and current responsive means, and means to associate said source of current with said first terminal, and said current responsive means to said second terminal.

14. In a testing system, a circuit to be tested, means associated with said circuit and responsive to incoming current to control the application of outgoing current to said circuit, a testing apparatus comprising a source of current and a current responsive means, whereby upon the association of said testing apparatus with said circuit to be tested the current responsive means will be actuated by said current applying means.

15. In a testing system, a circuit to be tested, a relay responsive to ringing current associated with said circuit, means under the control of said relay for applying outgoing ringing current to said circuit, a testing apparatus comprising a source of ringing current, and indicating means responsive to outgoing ringing current from a tested circuit, and means for associating said testing apparatus with said circuit whereby upon the response of said relay to current from said source said indicating means will be operated.

16. In a testing system, a circuit to be tested, controlling means associated with said circuit and operative in response to incoming ringing current to apply outgoing ringing current to said circuit, a testing apparatus comprising a source of ringing current and indicating means responsive to outgoing ringing current from a tested circuit, said indicating means having a circuit directly controlled by said controlling means of the tested circuit when the testing apparatus is associated therewith, and means for associating said testing apparatus with said circuit to be tested, whereby, upon the response of said controlling means to current from said source, the outgoing ringing current applied to said tested circuit by the controlling means will operate said indicating means if the circuit of the indicating means is closed.

17. A testing system comprising a circuit to be tested, a controlling means associated with said circuit, said controlling means being responsive to incoming ringing current applied to said circuit and to intermittent currents superposed on said circuit, an indicating means, said indicating means being responsive to actuation of said controlling means by ringing current but not responsive to its actuation by intermittent superposed currents, a testing apparatus comprising a source of ringing current, and means to apply current from said source to the circuit to be tested to operate said controlling means.

18. A testing system comprising a telephone transmission circuit to be tested, a high impedance relay bridged across said circuit, said relay being sensitive to incoming ringing current applied to said circuit and also sensitive to intermittent signaling currents applied to said circuit, a slow acting relay energized when said first mentioned relay is deënergized, indicating means controlled thereby, a testing apparatus comprising a source of ringing current, and means to apply current from said source to said telephone circuit whereby the high impedance relay is continuously actuated, causing said slow acting relay to deënergize and actuate said indicating means.

19. A testing system comprising a plurality of circuits to be tested, signaling apparatus for each circuit, the signaling apparatus of different circuits being responsive to signaling currents of different characteristics, a testing apparatus comprising a plurality of sources of current of different characteristics and a net-work to simulate the line with which a circuit to be tested is ordinarily used over which said currents may be applied to a circuit to be tested, said net-work being adjustable to vary the transmission with respect to currents of different characteristics, and selective means operative upon the association of the testing apparatus with a circuit to be tested to adjust said net-work in accordance with the transmission requirements of the signaling apparatus of that circuit.

20. A testing system comprising a plurality of circuits to be tested, said circuits having different transmission requirements with respect to signaling currents, a testing apparatus comprising a variable net-work, means to apply signaling current to a circuit to be tested over said net-work when the testing apparatus is associated with a circuit to be tested, and selective means operative upon the association of the testing apparatus with a circuit to be tested to adjust the net-work in accordance with the transmission requirement of that circuit.

21. A testing system comprising a plurality of circuits to be tested, testing apparatus therefor comprising a variable net-work, and selective means automatically operative to vary said net-work when applied to different circuits to be tested.

22. A testing system comprising a plurality of circuits to be tested, testing apparatus therefor including a net-work composed of series and shunt impedance, and means to selectively vary the shunt impedance when said testing apparatus is associated with different circuits to be tested.

23. A testing system comprising a repeater, a testing apparatus therefor including a net-work to simulate the type of line with which said repeater is ordinarily used, and means operative upon the association of said testing apparatus with said repeater to associate a circuit with said repeater to balance said first mentioned net-work.

24. A test circuit, a source of current variations therefor, indicating means for said circuit, means to amplify current variations impressed upon said circuit, adjustable means adapted to reduce the transmission efficiency of said circuit by an amount equal to the gain due to said amplifying means, means whereby said source may be applied to said indicating means over said test circuit directly, and means whereby said source may be applied to said indicating means over said circuit through said amplifier, and transmission reducing means whereby, when the same indication is given under both conditions, the adjustment of the transmission reducing means will be a measure of the grain due to the amplifier.

25. A testing system, comprising a circuit to be tested, an amplifying means associated with said circuit, means associated with said circuit for controlling said amplifying means, a testing apparatus and means associated with said testing apparatus for governing said controlling means.

26. A testing system, comprising a repeater circuit, ringing responsive means associated with said repeater circuit, a testing circuit including a source of ringing current and means to indicate to an operator applying said source to said repeater circuit the response of said ringing responsive means.

27. In a testing circuit, an amplifying repeater, a test circuit therefor, means to apply potential variations to said test circuit, and means to measure the transmission gain due to said repeater as compared with the transmission, independent of said repeater.

28. The method of testing a repeater which comprises applying electric impulses to an indicator, applying similar electric impulses to said repeater, applying the repeated impulses to said indicator, and varying the amplitude of said repeated impulses until substantially the same response is obtained in said indicator as when said first-mentioned impulses are applied thereto.

29. The method of operating a testing system comprising branched paths in one of which is placed an amplifying repeater to be tested, which comprises transmitting electric impulses through each of said paths to an indicator, and varying the amplitude of transmission through one of said paths until substantially an equal response is obtained in said indicator from each of said paths.

30. The method of operating a circuit for testing a repeater, which consists in applying current variations to said test circuit, transmitting the variations over said circuit with the repeater in circuit, adjusting the transmission efficiency of said circuit to neutralize the gain due to the repeater, and determining from the adjustment of the transmission efficiency the change in transmission introduced by the repeater.

In testimony whereof I have signed my name to this specification in the presence of two subscribing witnesses, this 24 day of January 1917.

JOHN F. TOOMEY.

Witnesses:
ALFRED KAUFMANN,
EDMUND SCHILP.